United States Patent [19]
Maeda et al.

[11] Patent Number: 6,005,765
[45] Date of Patent: Dec. 21, 1999

[54] COLLECTOR AND ELECTRIC DOUBLE LAYER CAPACITOR

[75] Inventors: Koichiro Maeda, Kawasaki; Yukari Kibi, Tokyo, both of Japan

[73] Assignees: Nippon Zeon Co., Ltd.; NEC Corporation, both of Tokyo, Japan

[21] Appl. No.: 09/113,496

[22] Filed: Jul. 10, 1998

Related U.S. Application Data

[63] Continuation of application No. PCT/JP97/00035, Jan. 10, 1997.

[30] Foreign Application Priority Data

Jan. 12, 1996 [JP] Japan .................................. 8-021738
Sep. 11, 1996 [JP] Japan .................................. 8-240503

[51] Int. Cl.⁶ ................................................ H01G 9/00
[52] U.S. Cl. .......................................... 361/502; 361/503
[58] Field of Search ................................. 361/502, 503, 361/504, 508, 509, 516, 525, 528, 532, 529; 29/25.03

[56] References Cited

FOREIGN PATENT DOCUMENTS

| | | |
|---|---|---|
| 49-42775 | 4/1974 | Japan . |
| 49-68254 | 7/1974 | Japan . |
| 62-58509 | 3/1987 | Japan . |
| 62-268119 | 11/1987 | Japan . |
| 63-213915 | 9/1988 | Japan . |
| 63-224103 | 9/1988 | Japan . |
| 64-54607 | 3/1989 | Japan . |
| 2-174210 | 7/1990 | Japan . |
| 2-216809 | 8/1990 | Japan . |
| 2-232916 | 9/1990 | Japan . |
| 3-283520 | 12/1991 | Japan . |
| 4-240708 | 8/1992 | Japan . |
| 5-217804 | 8/1993 | Japan . |
| 5-299296 | 11/1993 | Japan . |
| 7-86096 | 3/1995 | Japan . |
| 7-335494 | 12/1995 | Japan . |

*Primary Examiner*—Dean A. Reichard
*Assistant Examiner*—Anthony Dinkins
*Attorney, Agent, or Firm*—Armstrong, Westerman, Hattori, McLeland and Naughton

[57] ABSTRACT

A conductive rubber film having a volume resistivity in the direction perpendicular to the film surface of 0.1–5 Ωcm is obtained by blending 100 parts by weight of a rubber component comprising rubber with an iodine value of 30 or less (e.g. hydrogenated acrylonitrile butadiene copolymer rubber) with 5 to 100 parts by weight of conductive carbon having a specific surface area of 20 to 2000 m²/g, and forming the blend into a film of 0.01–0.2 mm thick by casting by the use of a solvent (e.g. methyl isobutyl ketone). The film is made into collectors and an electric double layer capacitor using an aqueous electrolyte is produced by using the collectors. This capacitor has a low internal resistance, namely, it can be obtained as a high-output capacitor.

14 Claims, No Drawings

COLLECTOR AND ELECTRIC DOUBLE LAYER CAPACITOR

This application is a continuation of PCT/JP97/00035 filed Jan. 10, 1997.

TECHNICAL FIELD

The present invention relates to a collector and an electric double layer capacitor using an aqueous electrolyte. More particularly, it relates to a collector composed of a conductive rubber film having a low volume resistivity, and an electric double layer capacitor with a low internal resistance using an aqueous electrolyte which is obtained by the use of said collector.

BACKGROUND ART

An electric double layer capacitor is an electric device comprising polarizable electrodes and an electrolyte. As the electrolyte, an electrolytic solution prepared by dissolving an electrolyte salt in water is generally used (JP-A-49-68254, etc.). The electric double layer capacitor has a function of storing electric charge in an electric double layer formed between the electrolytic solution and each electrode by polarization of the electrode. Such an electric double layer capacitor using an aqueous electrolyte is utilized as a small-sized power source for semiconductor memory backup, etc. and is under development as a large-sized power source for an automobile, etc.

Conventional electric double layer capacitors are roughly classified into two groups, i.e., those using an aqueous electrolyte, usually an aqueous sulfuric solution having a concentration of approximately 25–50% (JP-A-62-268119, JP-A-63-213915, JP-A-2-174210, etc.) and those using an organic solvent-based electrolyte (JP-A-49-68254, JP-A-7-86096, etc.). In general, the capacitors using an organic solvent-based electrolyte have a higher output voltage but are disadvantageous in that because of the low ionic conductivity of the electrolyte, the internal resistance is high, resulting in an insufficient output current. On the other hand, the capacitors using an aqueous electrolyte have a low output voltage but are advantageous in that because of the high ionic conductivity of the electrolyte, the internal resistance is low, resulting in a strong output current.

In addition, since the capacitors using an organic solvent-based electrolyte are flammable, the development of an electric double layer capacitor with a higher output using an aqueous electrolyte is desired from the viewpoint of safety.

However, for increasing the output of a large-sized power source obtained by connecting electric double layer capacitors using an aqueous electrolyte, as a plurality of cells in series or in parallel, the output current should be increased by reducing the internal resistance. The internal resistance is caused by the aqueous electrolyte, carbon as electrodes, collectors, etc. The internal resistance due to the aqueous electrolyte and carbon as electrodes can be reduced by thinning the cells of the capacitor, but the thinning decreases the capacity of each cell, so that the balance between capacity and voltage is lost.

A rubber film containing a conductive material is generally used as the collector (JP-A-2-174210, JP-A-4-240708, JP-A-5-299296, etc.). Such a conventional conductive rubber film, however, has a volume resistivity in the direction perpendicular to the surface of as high as approximately 8–500 Ωcm and hence makes it difficult to increase the output of the capacitor. Moreover, such a conductive rubber film is poor in acid resistance and hence is attacked by the acidic aqueous electrolyte when used for a long period of time, so that it is deteriorated in function or leaks the aqueous electrolyte in some cases.

DISCLOSURE OF THE INVENTION

An object of the present invention is to reduce the internal resistance of an electric double layer capacitor in order to provide the capacitor as a high-output electric double layer capacitor using an aqueous electrolyte. Specifically, it is to provide a collector having a low volume resistivity which is used in such an electric double layer capacitor.

The present inventors earnestly investigated and consequently found that a specific rubber film containing conductive carbon is usable as a collector having a low volume resistivity, whereby the present invention has been accomplished.

Thus, according to the present invention, there are provided a collector for an electric double layer capacitor using an aqueous electrolyte, which comprises a conductive rubber film comprising 100 parts by weight of a rubber component with an iodine value of 30 or less and 5 to 100 parts by weight of conductive carbon and having a volume resistivity in the direction perpendicular to the film surface of 0.1–5 Ωcm; and an electric double layer capacitor using an aqueous electrolyte which is obtained by the use of said collector.

BEST MODE FOR CARRYING OUT THE INVENTION

Rubber component

The rubber component of the conductive rubber used in the present invention comprises rubber having an iodine value of 30 or less, preferably 20 or less. The electrolyte used in the present invention is acidic, and hence when the rubber has too high an iodine value, it reacts with the electrolyte to be deteriorated and become non-functional in some cases. The tensile elongation at break of the rubber is preferably not less than 50%, more preferably not less than 100%, and preferably not more than 1000%, more preferably not more than 700%. The tensile strength at break of the rubber is preferably not less than 100 kgf/cm$^2$ and not more than 1000 kgf/cm$^2$. When the tensile elongation at break is too low, the resulting conductive rubber film is not sufficient in mechanical strength. When the tensile strength is too low, the resulting conductive rubber film is easily breakable by the gasket of a basic cell when used as a collector. Rubber having a tensile strength of more than 1000 kgf/cm$^2$ is difficult to obtain.

Specific examples of the rubber constituting the rubber component are rubbers containing no double bond in the main chain, such as ethylene-propylene copolymer rubber (so-called EPM), etc.; rubbers containing substantially no double bond in the main chain and having an iodine value of 30 or less, preferably 20 or less, such as terpolymer rubber of ethylene, propylene and a diene (e.c. dicyclopentadiene) (so-called EPDM), butyl rubber, etc.; and rubbers obtained by hydrogenating rubber having a high iodine value, such as diene rubber (e.g. polybutadiene rubber, polyisoprene rubber, acrylonitrile•butadiene copolymer rubber, or styrene•butadiene copolymer rubber) to adjust the iodine value to 30 or less, preferably 20 or less. The terpolymer rubber of ethylene, propylene and a diene (e.g. dicyclopentadiene), the butyl rubber and the hydrogenated acrylonitrile·butadiene copolymer rubber are preferable and the hydrogenated acrylonitrile•butadiene copolymer rubber is especially preferable, because these rubbers are resistant to the electrolyte, have a suitable tensile strength at break, and is hardly broken by the gasket of a basic cell.

If necessary, compounding ingredients such as softening agents (e.g. paraffinic process oil and naphthenic process oil), antioxidants, etc. may be incorporated into the rubber component so long as they do not lessen the effect of the present invention.

When the rubber component used in the present invention is not sufficient in strength, it may be reinforced by adding a resin besides the rubber and the above-exemplified compounding ingredients. The resin used is preferably one which is hardly attacked by the acidic electrolyte, for example, olefin resins (e.g. polyethylenes and polypropylenes) and polyvinyl chlorides. The polyvinyl chlorides excellent in acid resistance are especially preferable. The proportion of the resin added is preferably not less than 0.1 part by weight, more preferably not less than 5 parts by weight, and preferably not more than 50 parts by weight, more preferably not more than 20 parts by weight, per 100 parts by weight of the rubber. When the proportion is too low, the strength of the rubber component tends to be not sufficient. When the proportion is too high, the flexibility of the rubber component is not sufficient, so that problems such as difficult production of the capacitor are caused.

For increasing the strength of the conductive rubber film, it is possible to incorporate a crosslinking agent into the rubber component previously and crosslink the rubber component after its formation into a film. Although the crosslinking agent is not particularly limited, organic peroxides such as peroxy ketals, hydroperoxides, dialkyl peroxides, etc. are preferable. The amount of the crosslinking agent incorporated is preferably 0.1 to 5 parts by weight per 100 parts by weight of the rubber.

Conductive carbon

The conductive carbon contained in the conductive rubber used in the present invention is one which has a specific surface area of preferably not less than 20 $m^2/g$, more preferably not less than 50 $m^2/g$, and preferably not more than 2000 $m^2/g$. When the specific surface area is too small, the volume resistivity of the conductive rubber is undesirably increased. Conductive carbon having a specific surface area of more than 2000 $m^2/g$ is difficult to obtain.

Specific examples of conductive carbon are furnace blacks (e.g. conductive furnace black, superconductive furnace black and extraconductive furnace black), conductive channel black, acetylene black, etc. As commercially available conductive carbon, there can be preferably used CONTINEX CF (conductive furnace black mfd. by Continental Carbon Co.), KETJENBLACK EC (conductive furnace black mfd. by Ketjen Black International Co.), VULCAN C (conductive furnace black mfd. by Cabot Corp.), BLACK PEARLS 2000 (conductive furnace black mfd. by Cabot Corp.), Denka Acetylene Black (acetylene black mfd. by Denki Kagaku Kogyo Kabushiki Kaisha), etc.

Optional component

The conductive rubber used in the present invention can be improved in electroconductivity by using in combination therewith a conductive optional component such as conductive particles having a primary-particle size of not less than 10 nm, preferably not less than 20 nm, and not more than 100 nm, preferably not more than 80 nm, for example, flaky natural graphite, graphite fiber and carbon whisker.

Conductive rubber

The conductive rubber is obtained by blending the conductive carbon with the rubber component in an amount of not less than 5 parts by weight, preferably not less than 10 parts by weight, more preferably not less than 20 parts by weight, and not more than 100 parts by weight, preferably not more than 80 parts by weight, more preferably not more than 70 parts by weight, per 100 parts by weight of the rubber component. When the amount of the conductive carbon is too small, the volume resistivity of the conductive rubber film becomes too high. When the amount is too large, the conductive rubber film is not sufficient in strength and hence cannot be used as a collector.

When the above-mentioned conductive optional component is co-used, it is blended in an amount of preferably 0.1 to 5 parts by weight per 100 parts by weight of the rubber component. Since the conductive optional component tends to be oriented in the direction of the film surface, its blending in a large amount is disadvantageous in that a film obtained by casting the conductive rubber shows electric anisotropy.

When a film is produced by the casting method described hereinafter, it is not always necessary to knead previously the rubber component, the conductive carbon, and additional components such as the conductive optional component, the compounding ingredients, the resin and the crosslinking agent which are added if necessary. They may be individually dissolved or dispersed in a solvent in the preparation of a solution for casting. Particularly when the crosslinking agent is blended, melt kneading tends to cause crosslinking, so that the production of the film by the casting method becomes difficult. Therefore, the crosslinking agent is blended preferably in the preparation of a solution for casting.

Conductive rubber film

The conductive rubber film used in the present invention has a thickness of preferably not less than 0.01 mm, more preferably not less than 0.02 mm, most preferably not less than 0.04 mm, and preferably not more than 0.2 mm, more preferably not more than 0.1 mm, most preferably not more than 0.08 mm. When the film is too thin, its use is difficult because of its insufficient strength. When the film is too thick, the resistance is increased. The thickness is determined depending on, for example, the shape of the electric double layer capacitor.

The conductive rubber film used in the present invention has a volume resistivity in the direction perpendicular to the film surface of not less than 0.1 Ωcm, and not more than 5 Ωcm, preferably not more than 3 Ωcm, more preferably not more than 1 Ωcm.

The conductive rubber film used in the present invention is preferably produced by casting because the conductive carbon is easily and uniformly dispersed thereby in the whole film. When the conductive rubber film is produced by another method such as calendering, the conductive carbon tends to be oriented in the surface direction. Therefore, the volume resistivity is low when measured in the surface direction, but it is high in some cases when measured in the direction perpendicular to the surface.

The solvent used in the casting method is a solvent capable of dissolving the rubber component, for example, organic solvents, e.g., aromatic solvents such as benzene, toluene, xylene, etc.; ether solvents such as tetrahydrofluorene, etc.; and ketone solvents such as acetone, methyl ethyl ketone, methyl isobutyl ketone, etc. The rubber component, the conductive carbon, and additional components such as the conductive optional component, the compounding ingredients, the resin and the crosslinking agent which are added if necessary, are dissolved in such an organic solvent in a total amount of usually not less than 5 parts by weight, preferably not less than 10 parts by weight, more preferably not less than 15 parts by weight, and usually not more than 30 parts by weight, preferably not more than 25 parts by weight, more preferably not more than 20 parts by weight, per 100 parts by weight of the organic solvent, and the resulting solution is used. When the concentration is too low, no film having a sufficient thickness can be obtained. When the concentration is too high, the viscosity of the solution is too high, so that no film having a uniform thickness can be obtained.

The prepared solution is cast onto a smooth and flat surface of poly(ethylene terephthalate), Teflon, paper, metal or the like to a uniform thickness with a bar coater or the like.

The cast solution is usually dried at approximately 30–100° C. to be freed of the solvent. However, when the drying temperature is higher than or near the boiling point of the solvent, the cast solution is foamed to have an uneven surface in some cases. Therefore, the drying temperature is determined depending on characteristics of the solvent.

When the rubber component is crosslinked by blending the crosslinking agent, the cast solution is sufficiently freed of the solvent and then heated usually at 130–180° C. for 5–180 minutes, preferably approximately 10–120 minutes, to be subjected to crosslinking. When the crosslinking temperature is too high, the crosslinking agent is decomposed before sufficient crosslinking in some cases. Therefore, the crosslinking temperature is determined depending on characteristics of the crosslinking agent. As to the time of the crosslinking, it is not always necessary to carry out the crosslinking immediately after the removal of the solvent. The crosslinking may be carried out after assembling a capacitor, as in the case of, as described hereinafter, bonding a gasket and the present inventive collector composed of a conductive rubber film to each other by co-crosslinking to carry out sealing.

Electric double layer capacitor

The present inventive electric double layer capacitor using an aqueous electrolyte is obtained by using the above-mentioned conductive rubber film as a collector.

The electric double layer capacitor using an aqueous electrolyte includes not only a basic cell as a minimum constituent unit but also, in some cases, a power source with an increased output voltage obtained by connecting a plurality of basic cells in series, a power source with an increased output current obtained by connecting a plurality of basic cells in parallel, and a power source obtained by combining these power sources.

The basic cell composed of the electric double layer capacitor using an aqueous electrolyte is obtained by setting two electrodes with a separator between, locating a collector in contact with the outer surface of each electrode, filling the space with an electrolyte, and sealing the resulting assembly with gaskets so that at least a part of the outer surface of each collector may be exposed. The separator is for preventing short circuit caused by the contact between the electrodes. As the separator, there is used a material having a high permeability to the electrolyte and an excellent liquid-holding capacity, for example, glass fiber nonwoven fabric, nonwoven fabric of polypropylene or polyethylene fiber, or a porous membranes. The electrode is a polarizable electrode which has a high electric conductivity and does not undergo electrochemical reaction with the electrolyte. Solid activated carbon is usually used as the electrode. As the solid activated carbon, there is exemplified a material obtained by adding a phenolic resin or a fluororesin to powdery activated carbon and solidifying the resulting mixture. An aqueous sulfuric acid solution having a concentration of approximately 25–50% is used as the electrolyte because it is acidic and nonvolatile. The gasket is not particularly limited so long as it is acid resistant and can prevent the leakage of the electrolyte. As the gasket, there is usually used rubber having an iodine value of 30 or less, preferably 20 or less, like the rubber constituting the rubber component used in the present invention, for example, butyl rubber.

When the sealing is carried out using the gaskets, it is preferable to bond the collector and the gasket to each other without leaving any space between them which causes leakage of the electrolyte. As a method for bonding the collector and the gasket to each other, there are not only a method using an adhesive but a so a method of subjecting the rubber gasket containing a crosslinking agent and the collector containing a crosslinking agent to co-crosslinking. The method comprising the co-crosslinking is preferable because it requires only a simple procedure. A conductive rubber film is produced by the use of a rubber component containing a crosslinking agent, by the casting method or the like so as not to be crosslinked. The film is cut into pieces of suitable size and shape to obtain collectors, and an electric double layer capacitor is assembled by combining the collectors with gaskets and the like and then heated to be subjected to crosslinking. Thus, co-crosslinking is caused in the contact portion between the collector and the gasket to bond them together.

In view of the structure of the electric double layer capacitor using an aqueous electrolyte, the collector composed of a conductive rubber film is not a ways in contact with the electrode all over the surface of collector and is partly in contact with the electrolyte in some cases. Since the collector of the present invention is composed of a film excellent in resistance to the electrolyte, there is no fear of its deterioration by the electrolyte but in some cases, its physical strength varies depending on whether it is in contact with the electrode. In the present invention, for reducing this variation, the collector may be reinforced with a sheet made of a macromolecular material resistant to the electrolyte. The sheet cannot be made present between the collector and the electrode but can be made present, for example, between the gasket and the collector.

The macromolecular material resistant to the electrolyte which constitutes the sheet is not particularly limited in electrical characteristics such as volume resistivity so long as it is resistant to the electrolyte. As the macromolecular material, there are exemplified rubbers containing no double bond in the main chain, such as ethylene-propylene copolymer rubbers (so-called EPM), etc.; rubbers containing substantially no double bond in the main chain, such as terpolymer rubbers of ethylene, propylene and a diene (e.g. di-cyclopentadiene) (so-called EPDM), butyl rubbers, etc.; rubbers such as diene rubbers including polybutadiene rubber, polyisoprene rubber, acrylonitrile•butadiene copolymer rubber, styrene•butadiene copolymer rubber, etc.; and resins such as polyethylenes, polypropylenes, ABS resins, etc. it is sufficient that the collector and the sheet are bonded to each other with an adhesive or the like.

EXAMPLES

The present invention is explained below with reference to examples and comparative examples. The volume resistivity of each film was measured in the direction perpendicular to the surface by means of a 3220 low-resistance meter mfd. by HIOKI E.E. Corp., and the capacity was determined by carrying out charge at 1 V and discharge to 0.8 V and measuring a change in the quantity of electric current.

Example 1

To 500 parts by weight of methyl isobutyl ketone were added 100 parts by weight of hydrogenated acrylonitrile•butadiene copolymer rubber (Zetpol 2000, mfd. by Nippon Zeon Co., Ltd.; iodine value 4, tensile elongation at break 560%, tensile strength at break 128 kgf/cm$^2$) and 25 parts by weight of conductive carbon (KETJENBLACK EC, mfd. by Ketjen Black International Co.; specific surface area about 800 m$^2$/g). The mixture was made into a homogeneous slurry with an ultrasonic dispersing machine, followed by adding thereto 0.5 part by weight of a crosslinking agent (Perhexa 3M, 1,1-bis(t-butylperoxy)-3,3,5-trimethyl-cyclohexane mfd. by Nippon Oils and Fats Co., Ltd.), and the resulting mixture was thoroughly stirred to be homogenized. The slurry thus obtained was casted onto a flat and smooth poly(ethylene terephthalate) film with a bar coater and dried at 80° C. for 16 hours to obtain a uniform conductive cast film of 27 μm thick. After a part of the film was maintained at 150° C. for 2 hours to be crosslinked, its volume resistivity was measured and found to be 0.52 Ωcm.

The non-crosslinked conductive cast film obtained above was cut into discs with a diameter of 15 mm to obtain collectors of the present invention. In addition, 80 parts by weight of activated carbon having a specific surface area of about 1700 m$^2$/g, 10 parts by weight of a polytetrafluoroethylene and 10 parts by weight of acetylene black were kneaded and then pressed into a sheet of 2 mm thick, which was cut into discs with a diameter of 10 mm to obtain two solid activated carbon electrodes. Further, 100 parts by weight of butyl rubber (BUTYL 365, mfd. by Japan Synthetic Rubber Co., Ltd.; iodine value 25) was kneaded with 1.0 part by weight of a crosslinking agent (Tamanol 531, an alkylphenol-formaldehyde resin mfd. by Arakawa Chemical Industries, Ltd.) so as not to be crosslinked, and the resulting mixture was molded into two ring gaskets (outside diameter 15 mm, inside diameter 10 mm, and thickness 2 mm).

Each solid activated carbon electrode was inserted into the center hole of the ring gasket, and between the thus obtained two discs with a diameter of 15 mm and a thickness of 2 mm, a separator with a thickness of 25 μm and a diameter of 11 mm (Celgard #2400, polypropylene fiber nonwoven fabric mfd. by Hoechst Celanese Corp.) was held so that its center might coincide in position with those of the discs. Then, the resulting assembly was held between two of the collectors so that its center might coincide in position with those of the collectors. The cell, i.e., a space surrounded by the gaskets and the collectors was filled with a 30% aqueous sulfuric acid solution, and the assembly thus obtained was maintained at 150° C. for 2 hours under a pressure which did not cause leakage of the solution. Thus, the gaskets and the collectors were subjected to co-crosslinking to produce a basic cell composed of an electric double layer capacitor of the present invention. The basic cell obtained by the crosslinking of the collectors had a resistance of 2.7Ω and a capacity of 20 mF.

Example 2

To 500 parts by weight of toluene were added 100 parts by weight of butyl rubber (BUTYL 365, mfd. by Japan Synthetic Rubber Co., Ltd.; iodine value 25, tensile elongation at break 300%, tensile strength at break 105 kgf/cm$^2$) and 20 parts by weight of conductive carbon (KETJENBLACK EC). The mixture was made into a homogeneous slurry with an ultrasonic dispersing machine, followed by adding thereto 1.0 part by weight of a crosslinking agent (Tamanol 531), and the resulting mixture was thoroughly stirred to be homogenized. The slurry thus obtained was casted onto a flat and smooth poly(ethylene terephthalate) film with a bar coater and dried at 80° C. for 16 hours to obtain a uniform conductive cast film of 25 μm thick. After a part of the film was maintained at 150° C. for 30 minutes to be crosslinked, its volume resistivity was measured and found to be 0.52 Ωcm.

The non-crosslinked conductive cast film obtained above was cut into discs with a diameter of 15 mm to obtain collectors of the present invention. A basic cell composed of an electric double layer capacitor of the present invention was produced by carrying out the same assemblies and crosslinking as in Example 1 except for using the collectors obtained in Example 2. This basic cell had a resistance of 2.0Ω and a capacity of 18 mF.

Example 3

To 500 parts by weight of methyl isobutyl ketone were added 100 parts by weight of hydrogenated acrylonitrile•butadiene copolymer rubber (Zetpol 2000, mfd. by Nippon Zeon Co., Ltd.; iodine value 4, tensile elongation at break 560%, tensile strength at break 128 kgf/cm$^2$) and 60 parts by weight of conductive carbon (KETJENBLACK EC, mfd. by Ketjen Black International Co.; specific surface area about 800 m$^2$/g). The mixture was made into a homogeneous slurry with an ultrasonic dispersing machine, followed by adding thereto 0.5 part by weight of a crosslinking agent (Perhexa 3M, 1,1-bis(t-butylperoxy)-3,3,5-trimethyl-cyclohexane mfd. by Nippon Oils and Fats Co., Ltd.), and the resulting mixture was thoroughly stirred to be homogenized. The slurry thus obtained was casted onto a flat and smooth poly(ethylene terephthalate) film with a bar coater and dried at 80° C. for 16 hours to obtain a uniform conductive cast film of 25 μm thick. After a part of the film was maintained at 150° C. for 2 hours to be crosslinked, its volume resistivity was measured and found to be 0.25 Ωcm.

The non-crosslinked conductive cast film obtained above was cut into discs with a diameter of 15 mm to obtain collectors of the present invention. A basic cell composed of an electric double layer capacitor of the present invention was produced by carrying out the same assemblies and crosslinking as in Example 1 except for using the collectors obtained in Example 3. This basic cell had a resistance of 2.2Ω and a capacity of 28 mF.

Example 4

A crosslinked film obtained in the same manner as in Example 1 was cut into discs with a diameter of 15 mm to obtain collectors of the present invention. A polypropylene film of 50 μm thick was cut into rings with an outside diameter of 15 mm and an inside diameter of 10 mm, and the rings were attached to both sides, respectively, of each film with an adhesive. Each of the reinforced film was pressure-bonded to a solid activated carbon electrode. Between the assemblies thus obtained, ring gaskets (outside diameter 15 mm, inside diameter 12 mm, and thickness 1.95 mm) made of crosslinked butyl rubber and a separator were held so that their centers might coincide in position with those of the assemblies. Filling with an electrolyte was carried out through the space between the gaskets. After the filling, the separator and the gaskets were bonded to each other.

The basic cell thus obtained had a resistance of 2.8Ω and a capacity of 19 mF.

Comparative Example 1

100 Parts by weight of butyl rubber (BUTYL 365) was kneaded with 20 parts by weight of conductive carbon (KETJENBLACK EC) and 1.0 part by weight of a crosslinking agent (Tamanol 531) so as not to be crosslinked, and the resulting mixture was made into a conductive rubber film of 220 μm thick by calendering. After the film was heated at 150° C. for 30 minutes to be crosslinked, its volume resistivity was measured and found to be 5.5 Ωcm.

The non-crosslinked conductive cast film obtained above was cut into discs with a diameter of 15 mm. A basic cell composed of an electric double layer capacitor was produced by carrying out the same assemblies and crosslinking as in Example 1 except for using said discs as collectors. This basic cell had a resistance of 7.2 Ω and a capacity of 11 mF.

INDUSTRIAL APPLICABILITY

Since the conductive rubber film used in the present invention is excellent in acid resistance, it is hardly deteriorated by an acidic electrolyte, has stable performance characteristics, and has a low volume resistivity in the direction perpendicular to the surface. Therefore, a basic cell composed or an electric double layer capacitor using an aqueous electrolyte which is obtained by using said film as a collector can be used for a long period of time. Furthermore, since the basic cell has a low resistance and a large capacity, it becomes possible to produce a stable and high-output electric double layer capacitor using an aqueous electrolyte, by connecting the basic cells in series or in parallel.

What is claimed is:

1. A collector for an electric double layer capacitor using an aqueous electrolyte, which comprises a conductive rubber film comprising (i) 100 parts by weight of a rubber component comprising a rubber with an iodine value of 30 or less, and (ii) 5 to 100 parts by weight of conductive carbon, said conductive rubber film having a volume resistivity in a direction perpendicular to a surface of the conductive rubber film of 0.1–5 Ωcm.

2. A collector for an electric double layer capacitor using an aqueous electrolyte according to claim 1, wherein a tensile elongation at break of the rubber is 50 to 1000%.

3. A collector for an electric double layer capacitor using an aqueous electrolyte according to claim 1 or 2, wherein a tensile strength at break of the rubber is 100 to 1000 kgf/cm$^2$.

4. A collector for an electric double layer capacitor using an aqueous electrolyte according to any one of claims 1 or 2, wherein the conductive rubber film is produced by casting.

5. A collector for an electric double layer capacitor using an aqueous electrolyte according to claim 1 or 2, wherein the rubber is selected from the group consisting of (a) terpolymer rubber of ethylene, propylene and a diene, (b) butyl rubber, and (c) hydrogenated acrylonitrile butadiene copolymer rubber.

6. A collector for an electric double layer capacitor using an aqueous electrolyte according to claim 1 or 2, wherein a specific surface area of the conductive carbon is 20 to 2000 m$^2$/g.

7. A collector for an electric double layer capacitor using an aqueous electrolyte according to claim 1 or 2, wherein the thickness of the conductive rubber film is 0.01 to 0.2 mm.

8. A collector for an electric double layer capacitor using an aqueous electrolyte according to claim 1 or 2, wherein the conductive rubber film further comprises a crosslinking agent in an amount of 0.1 to 5 parts by weight per 100 parts by weight of the rubber.

9. A collector for an electric double layer capacitor using an aqueous electrolyte according to claim 8, wherein the crosslinking agent is an organic peroxide.

10. A collector for an electric double layer capacitor using an aqueous electrolyte according to claim 4, wherein the conductive rubber film is produced by casting a solution containing the rubber component and the conductive carbon in a total amount of 5 to 30 parts by weight per 100 parts by weight of an organic solvent, and removing the organic solvent at 30–100° C.

11. A collector for an electric double layer capacitor using an aqueous electrolyte according to claim 4, wherein the conductive rubber film is produced by casting a solution containing the rubber component and the conductive carbon in a total amount of 5 to 30 parts by weight per 100 parts by weight of an organic solvent, removing the organic solvent at 30–100° C. to obtain a residue, and then maintaining the residue at 130–180° C. for 5 to 180 minutes to subject the residue to crosslinking.

12. An electric double layer capacitor using an aqueous electrolyte comprising a collector according to claim 1 or 2.

13. An electric double layer capacitor using an aqueous electrolyte according to claim 12, wherein a portion of the collector which is not in contact with an electrode is reinforced with a sheet made of a macromolecular material resistant to the electrolyte.

14. An electric double layer capacitor using an aqueous electrolyte, comprising collectors according to claim 8 and gaskets made of rubber containing a crosslinking agent, wherein the electric double layer capacitor is produced by subjecting the collectors and the gaskets to crosslinking by heating to bond the collectors to the gaskets, respectively.

* * * * *